US012781003B2

(12) United States Patent
Kanaya et al.

(10) Patent No.: US 12,781,003 B2
(45) Date of Patent: Nov. 3, 2026

(54) BIAXIALLY ORIENTED POLYPROPYLENE FILM

(71) Applicant: TOYOBO CO., LTD., Osaka (JP)

(72) Inventors: Atsushi Kanaya, Inuyama (JP); Toru Imai, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 186 days.

(21) Appl. No.: 18/724,457

(22) PCT Filed: Dec. 15, 2022

(86) PCT No.: PCT/JP2022/046274
§ 371 (c)(1),
(2) Date: Jun. 26, 2024

(87) PCT Pub. No.: WO2023/127534
PCT Pub. Date: Jul. 6, 2023

(65) Prior Publication Data

US 2025/0066565 A1 Feb. 27, 2025

(30) Foreign Application Priority Data

Dec. 28, 2021 (JP) ................................ 2021-214641

(51) Int. Cl.
*C08J 5/18* (2006.01)
*C08J 3/28* (2006.01)

(52) U.S. Cl.
CPC . *C08J 5/18* (2013.01); *C08J 3/28* (2013.01); *C08J 2323/12* (2013.01)

(58) Field of Classification Search
CPC .......... B32B 27/32; C08L 23/10; C08L 23/12; C08L 23/14; C08L 23/142
See application file for complete search history.

(56) References Cited

U.S. PATENT DOCUMENTS

| | | | |
|---|---|---|---|
| 6,410,132 | B1 | 6/2002 | Peiffer et al. |
| 2009/0136714 | A1 | 5/2009 | Itou |
| 2013/0170096 | A1 | 7/2013 | Sugata et al. |
| 2020/0198298 | A1 | 6/2020 | Imanishi et al. |
| 2021/0229408 | A1 | 7/2021 | Dou et al. |
| 2023/0330977 | A1 | 10/2023 | Nakano et al. |
| 2024/0051275 | A1 | 2/2024 | Kashiwa et al. |

FOREIGN PATENT DOCUMENTS

| | | | |
|---|---|---|---|
| EP | 2181843 | A1 | 5/2010 |
| JP | 2002-154187 | A | 5/2002 |
| JP | 2007-126644 | A | 5/2007 |
| JP | 2012-017417 | A | 1/2012 |
| JP | 2015-178594 | A | 10/2015 |
| WO | WO 2007/094072 | A1 | 8/2007 |
| WO | WO 2012/002123 | A1 | 1/2012 |
| WO | 2017/169952 | A1 | 10/2017 |
| WO | WO 2017/221781 | A1 | 12/2017 |
| WO | WO 2018/142983 | A1 | 8/2018 |
| WO | WO 2019/044758 | A1 | 3/2019 |
| WO | 2022/004340 | A1 | 1/2022 |
| WO | 2022/153906 | A1 | 7/2022 |

OTHER PUBLICATIONS

WO 2017-169952 Machine Translation (Year: 2017).*
European Patent Office, Extended European Search Report in European Patent Application No. 22915758.1 (Oct. 21, 2025).
Japan Patent Office, International Search Report in International Patent Application No. PCT/JP2022/046274 (Feb. 21, 2023).
China National Intellectual Property Administration, Office Action in Chinese Patent Application No. 202280083445.3 (Dec. 8, 2025).
China National Intellectual Property Administration, Office Action in Chinese Patent Application No. 202280083445.3 (May 14, 2026).
Intellectual Property India, Office Action in Indian Patent Application No. 202447052368 (May 12, 2026).

* cited by examiner

*Primary Examiner* — Zachary M Davis
(74) *Attorney, Agent, or Firm* — Leydig, Voit & Mayer, Ltd.

(57) ABSTRACT

Provided is a biaxially oriented polypropylene film that is suitable as a raw film for processing and that, without impairing excellent transparency and mechanical properties intrinsically possessed by the biaxially oriented polypropylene film, exhibits excellent adhesiveness at the time of vapor deposition, coating, or lamination with another film and also has favorable slipperiness and blocking resistance. The biaxially oriented polypropylene film contains a base material layer (A) and a surface layer (B), each of which contains a polypropylene-based resin as a main component, wherein (1) the number of protrusions of 500 nm or larger in a surface area of 2000 $\mu m^2$ on the surface layer (B) is 50-200, (2) a surface of the surface layer (B) has a wetting tension of 38 mN/m or higher, (3) the surface has a Martens hardness of 350 $N/mm^2$ or lower, and (4) the surface has an arithmetic average roughness (Ra) of 1.5-3.0 nm.

12 Claims, No Drawings

BIAXIALLY ORIENTED POLYPROPYLENE FILM

TECHNICAL FIELD

The present invention relates to a biaxially oriented polypropylene film. Specifically, the present invention relates to a biaxially oriented polypropylene film having excellent film winding quality and excellent adhesiveness to a vapor deposition layer or a coat layer made from inorganic matter or organic matter or to an adhesive layer used for lamination with another member film.

BACKGROUND ART

Conventionally, biaxially oriented polypropylene films have exceptionally excellent transparency and mechanical properties, and thus, are widely used as packaging materials for various products such as food and textile products. However, polypropylene films have problems. For example, the following problem has been pointed out. That is, polypropylene resins are nonpolar, and thus, have low surface energies, whereby a sufficient adhesion force is not obtained in processing such as: vapor deposition or coating with use of inorganic matter or organic matter; or lamination with another member film.

In particular, polypropylene films also have, in addition to the problem regarding the adhesion force, the following problem in the case of forming a thin film layer through vapor deposition or coating. That is, such a thin film cannot be formed owing to a protrusion portion present on an uneven surface, whereby barrier properties and the like become poor. Meanwhile, biaxially oriented polypropylene films have excellent flexibility and flatness, and thus, have poor slipperiness and experience blocking in which the films stick to each other. Considering this, in general, an anti-blocking agent is added to biaxially oriented polypropylene films so as to form uneven surfaces. Consequently, owing to the uneven surfaces formed, formation of thin films through vapor deposition or coating is performed insufficiently, and the insufficient formation leads to poor barrier properties and the like.

As countermeasures against these problems, various methods have been proposed. For example, a method has been disclosed in which a branched-chain polypropylene is mixed with a propylene resin, and crystal transformation of beta crystal of the polypropylene to alpha crystal is caused so as to form recesses and protrusions on a film surface, whereby a favorable slipperiness is obtained by using substantially no anti-blocking agent made from inorganic matter or organic matter (see, for example, Patent Literature 1 or the like).

In addition, a method has been disclosed in which recesses and protrusions are formed on a film surface layer by using an anti-blocking agent, and the adhesiveness to ink and the adhesiveness at the time of lamination with another member film are increased (see, for example, Patent Literature 2 or the like).

However, the film winding quality and gas barrier properties exhibited after forming a vapor deposition layer or a coat layer, have been desired to be further improved.

CITATION LIST

Patent Literature

[PTL 1] International Publication No. WO2007/094072
[PTL 2] International Publication No. WO2018/142983

SUMMARY OF THE INVENTION

Problems to be Solved by the Invention

An object of the present invention is to provide a biaxially oriented polypropylene film that has, without impairing excellent transparency and mechanical properties intrinsically possessed by the biaxially oriented polypropylene film, excellent film winding quality and excellent adhesiveness to a vapor deposition layer, a coat layer, or an adhesive layer used for lamination with another member film.

Solution to the Problems

The present invention, which has solved the above problems, is a biaxially oriented polypropylene film comprising:

a base material layer (A) containing a polypropylene-based resin as a main component; and a surface layer (B) containing a polypropylene-based resin as a main component and satisfying the following conditions (1) to (4), (1) the number of protrusions of 500 nm or larger in a surface area of 2000 $\mu m^2$ on the surface layer (B) is 50 or larger and 200 or smaller, (2) a surface of the surface layer (B) has a wetting tension of 38 mN/m or higher, (3) the surface has a Martens hardness of 350 $N/mm^2$ or lower, and (4) the surface has an arithmetic average roughness of 1.5 nm or larger and 3.0 nm or smaller.

In this case, it is preferable that the film has a haze value of 6% or lower.

Further, in this case, it is preferable that the film has a tensile elastic modulus, in a machine direction, of 2.0 GPa or higher and has a tensile elastic modulus, in a transverse direction, of 3.0 GPa or higher.

Furthermore, in this case, it is preferable that the film has a thickness of 5 μm or larger and 200 μm or smaller.

In addition, it is preferable that a laminated body comprising: any one of the biaxially oriented polypropylene film; and an unstretched polypropylene film.

Advantageous Effects of the Invention

The biaxially oriented polypropylene film in the present invention, without impairing excellent transparency and mechanical properties intrinsically possessed by the biaxially oriented polypropylene film, has excellent film winding quality and exhibits excellent adhesiveness to a vapor deposition layer, a coat layer, or an adhesive layer used for lamination with another film.

DESCRIPTION OF EMBODIMENTS

The biaxially oriented polypropylene film of the present invention comprises a base material layer (A) containing a polypropylene-based resin as a main component; and a surface layer (B) containing a polypropylene-based resin as a main component and satisfying the following conditions (1) to (4), (1) the number of protrusions of 500 nm or larger in a surface area of 2000 $\mu m^2$ on the surface layer (B) is 50 or larger and 200 or smaller, (2) a surface of the surface layer (B) has a wetting tension of 38 mN/m or higher, (3) the surface has a Martens hardness of 350 $N/mm^2$ or lower, and (4) the surface has an arithmetic average roughness (Ra) of 1.5 nm or larger and 3.0 nm or smaller.

If the number of protrusions of 500 nm or larger in a surface area of 2000 $\mu m^2$ on the surface of the surface layer (B) is large, the area of contact between the surface layer (B) and another surface layer at the time of blocking between films or slippage with respect to a metal or the like is decreased. This decrease leads to improvement of slipperiness and blocking resistance, and hence, improvement of the film winding quality.

The wetting tension of the surface of the surface layer (B) indicates the numerical value of the surface tensions (mN/m) of liquid mixture reagent determined to wet the surface layer (B) and is related to the wettability of a vapor deposition layer, a coat layer, or an adhesive layer.

The Martens hardness of the surface of the surface layer (B) indicates the hardness of the surface layer (B) obtained when the corresponding surface is stuck, by about 0.1 μm, with a needle tip having a curvature radius of 0.1 μm or smaller by using a dynamic ultra-microhardness tester. The feature of having low Martens hardnesses indicates that the surface layer (B) is soft. Said feature makes it easy for the surface layer (B) to follow movement of a vapor deposition layer, a coat layer, or an adhesive layer stacked on the surface of the surface layer (B). Thus, said feature leads to improvement of the adhesiveness to the vapor deposition layer, the coat layer, or the adhesive layer, and hence, improvement of gas barrier properties.

The arithmetic average roughness (also referred to as Ra) of the surface of the surface layer (B) is obtained according to the definition of an arithmetic average roughness described in JIS-B0601 (1994), by using a scanning probe microscope (AFM). The arithmetic average roughness is an index indicating the extent of unevenness of a surface at a comparatively flat portion other than comparatively large top and bottom portions. The arithmetic average roughness is related to the adhesiveness to a vapor deposition layer, a coat layer, or an adhesive layer used for lamination with another member. If the arithmetic average roughness (Ra) is low, a vapor deposition layer, a coat layer, or an adhesive layer is evenly stacked on the film surface, and hence, the low Ra leads to improvement of the gas barrier properties.

(1) Base Material Layer (A)

The base material layer (A) of the biaxially oriented polypropylene film in the present invention contains a polypropylene-based resin as a main component. As the polypropylene-based resin that forms the base material layer (A), it is possible to use: a polypropylene homopolymer containing no copolymerization component; or a polypropylene resin obtained by copolymerizing ethylene and/or an α-olefin having four or more carbon atoms in an amount of 0.5 mol % or lower. The amount of the copolymerization component is preferably 0.3 mol % or lower and more preferably 0.1 mol % or lower. The polypropylene-based resin is most preferably a polypropylene homopolymer containing no copolymerization component.

If the copolymerization amount of the ethylene and/or the α-olefin having four or more carbon atoms is 0.5 mol % or lower, the crystallinity and the rigidity are less likely to be decreased, and the heat shrinkage rate at a high temperature is less likely to become high. These resins may be blended and used. The main component mentioned herein means that the highest amount component contained in the surface layer (A). The amount is preferably 50% by weight or higher, more preferably 55% by weight or higher, further preferably 60% by weight or higher, and most preferably 70% by weight or higher.

The polypropylene-based resin that forms the base material layer (A) of the biaxially oriented polypropylene film in the present invention has a mesopentad fraction ([mmmm] %) which is measured by using $^{13}$C-NMR and which is an index of the stereoregularity of the polypropylene-based resin. The mesopentad fraction is preferably 97.5% or higher and 99.5% or lower. The mesopentad fraction is more preferably 98.0% or higher, further preferably 98.5% or higher. If the mesopentad fraction of the polypropylene-based resin is 97.5% or higher, the elastic modulus becomes high, and the heat resistance is also improved. The realistic upper limit of the mesopentad fraction is 99.5%.

The polypropylene-based resin that forms the base material layer (A) of the biaxially oriented polypropylene film in the present invention has a mass average molecular weight (Mw) of preferably 180,000 or higher and 500,000 or lower.

If the Mw is lower than 180,000, the melt viscosity is low, and thus stability is not obtained at the time of casting, whereby the film formability might deteriorate. Meanwhile, if the Mw is higher than 500,000, the amount of a component having a molecular weight of 100,000 or lower is decreased, and the heat shrinkage rate at a high temperature is less likely to be decreased.

The lower limit of the Mw is more preferably 190,000, further preferably 200,000, and particularly preferably 220,000. Meanwhile, the upper limit of the Mw is more preferably 350,000, further preferably 340,000, and particularly preferably 330,000.

The polypropylene-based resin that forms the base material layer (A) of the biaxially oriented polypropylene film in the present invention has a number average molecular weight (Mn) of preferably 20,000 or higher and 200,000 or lower.

If the Mn is lower than 20,000, the melt viscosity is low, and thus stability is not obtained at the time of casting, whereby the film formability might deteriorate. Meanwhile, if the Mn is higher than 200,000, the heat shrinkage rate at a high temperature is less likely to be decreased.

The lower limit of the Mn is more preferably 30,000, further preferably 40,000, and particularly preferably 50,000. Meanwhile, the upper limit of the Mn is more preferably 100,000, further preferably 90,000, and particularly preferably 85,000.

Mw/Mn serves as an index of a molecular weight distribution. The Mw/Mn of the polypropylene-based resin that forms the base material layer (A) is preferably 2.5 or higher and 10.0 or lower. The Mw/Mn is more preferably 3.0 or higher and 9.0 or lower, further preferably 3.5 or higher and 7.0 or lower, and particularly preferably 3.5 or higher and 6.0 or lower. If the Mw/Mn is 2.5 or higher, the heat shrinkage rate at a high temperature is less likely to be decreased.

The molecular weight distribution of the polypropylene-based resin can be adjusted by: polymerizing components having different molecular weights in multiple stages by using a series of plant equipment; blending components having different molecular weights offline by using a kneader; performing polymerization through blending of catalysts having different performances; or using a catalyst with which a desired molecular weight distribution can be obtained.

The polypropylene-based resin that forms the base material layer (A) of the biaxially oriented polypropylene film in the present invention has preferably a melt flow rate (MFR) at 230° C. and at 2.16 kgf of 1.0 g/10 min or higher and 10 g/10 min or lower.

The lower limit of the MFR of the polypropylene-based resin that forms the base material layer (A) is more preferably 1.2 g/10 min, further preferably 1.5 g/10 min, even more preferably 1.8 g/10 min, and particularly preferably 2.0 g/10 min. The upper limit of the MFR of the polypropylene-based resin that forms the base material layer (A) is more preferably 9.0 g/10 min and further preferably 8.0 g/10 min.

If the Mw/Mn and the MFR of the polypropylene-based resin that forms the base material layer (A) are within the respective ranges, the tensile elastic modulus can be kept high, and the heat shrinkage rate at a high temperature can be kept low.

In the base material layer (A) of the biaxially oriented polypropylene film in the present invention, an additive or another resin may be contained. Examples of the additive include antioxidants, ultraviolet absorbers, nucleating agents, tackiness agents, antifogging agents, flame retardants, inorganic or organic fillers, and the like. Examples of the other resin include: polypropylene resins other than the polypropylene resin used in the present invention; random copolymers each of which is a copolymer of propylene and ethylene and/or an α-olefin having four or more carbon atoms; various types of elastomers; and the like. These components may be successively polymerized by using a multistage reactor. Alternatively, these components may be blended with the polypropylene resin by using a Henschel mixer. Alternatively, master pellets made by using a melt-kneader in advance may be diluted with polypropylene so as to have a predetermined concentration. Alternatively, the entirety may be melt-kneaded in advance and used. A surfactant may be added in order to decrease a surface resistivity. The amount of the surfactant with respect to the polypropylene-based resin that forms the base material layer (A) is preferably 6000 ppm or smaller, more preferably 1500 ppm, further preferably 500 ppm, and particularly preferably 100 ppm or smaller.

(2) Surface Layer (B)

The surface layer (B) of the biaxially oriented polypropylene film in the present invention contains a polypropylene-based resin as a main component. As the polypropylene-based resin that forms the surface layer (B), it is possible to use: a polypropylene homopolymer containing no copolymerization component; or a polypropylene resin obtained by copolymerizing ethylene and/or an α-olefin having four or more carbon atoms in an amount of 0.5 mol % or lower. The amount of the copolymerization component is preferably 0.3 mol % or lower and more preferably 0.1 mol % or lower. The polypropylene-based resin is most preferably a polypropylene homopolymer containing no copolymerization component.

Examples of the α-olefin having four or more carbon atoms include 1-butene, 1-hexene, 4-methyl-1-pentene, 1-octene, and the like. In addition, as another copolymerization component, maleic acid having polarity or the like may be used.

If the copolymerization amount of the ethylene and/or the α-olefin having four or more carbon atoms is 0.5 mol % or lower, the crystallinity and the rigidity are less likely to be decreased, and the heat shrinkage rate at a high temperature is less likely to become high. These resins may be blended and used. The main component mentioned herein means that the highest amount component contained in the surface layer (B). The amount is preferably 50% by weight or higher, more preferably 80% by weight or higher, further preferably 90% by weight or higher, and most preferably 95% by weight or higher.

As the polypropylene-based resin that forms the surface layer (B), a mixture of two or more types of polypropylene-based resins having different melt flow rates (MFR) may be used.

It is inferred that, if the difference among the melt flow rates (MFR) of the two or more types of polypropylene-based resins in the polypropylene-based resin mixture is small, the crystallization rate and the degree of crystallinity do not significantly differ among these polypropylene-based resins, and minute recesses and protrusions are easily formed on the surface. However, attention needs to be paid to the following facts. That is, if the cooling speed of an unstretched sheet is low at the time of manufacturing of a film, the extent of surface unevenness due to spherulites becomes large, and the stretching temperature is excessively high at the time of stretching in the machine direction or the transverse direction so that the extent of the surface unevenness is likely to become large.

As each of the polypropylene-based resins, it is possible to use: a polypropylene homopolymer containing no copolymerization component; or a polypropylene resin obtained by copolymerizing ethylene and/or an α-olefin having four or more carbon atoms in an amount of 0.5 mol % or lower. The amount of the copolymerization component is preferably 0.3 mol % or lower and more preferably 0.1 mol % or lower. A polypropylene homopolymer containing no copolymerization component is most preferred.

Examples of the α-olefin having four or more carbon atoms include 1-butene, 1-hexene, 4-methyl-1-pentene, 1-octene, and the like. In addition, as another copolymerization component, maleic acid having polarity or the like may be used The total copolymerization amount of ethylene and/or an α-olefin having four or more carbon atoms and the other copolymerization component is preferably 0.5 mol % or lower.

The polypropylene resin used in the present invention is obtained by polymerizing propylene as a raw material using any of publicly-known catalysts such as a Ziegler-Natta catalyst and a metallocene catalyst. Among these catalysts, in order to eliminate hetero bonds, a Ziegler-Natta catalyst is used, and a catalyst with which polymerization can be performed so as to achieve a high stereoregularity is preferably used.

As a method for polymerizing propylene as a raw material, a publicly-known method may be employed. Examples of the method include: a method that includes performing polymerization in an inert solvent such as hexane, heptane, toluene, or xylene; a method that includes performing polymerization in a liquid monomer; a method that includes adding a catalyst to a gaseous monomer and performing polymerization in a gaseous phase state; a method that includes performing polymerization through combination of these methods; and the like.

The polypropylene-based resin that forms the surface layer (B) of the biaxially oriented polypropylene film in the present invention has a mesopentad fraction ([mmmm] %) which is measured by using $^{13}C$-NMR and which is an index of the stereoregularity of the polypropylene-based resin. The mesopentad fraction is preferably 90.0% or higher and 99.5% or lower. The lower limit of the mesopentad fraction is more preferably 92.0% or higher, further preferably 93.0% or higher, and particularly preferably 93.5%. The upper limit of the mesopentad fraction is more preferably 99.0% or lower, further preferably 98.5% or lower, and particularly preferably 98.0% or lower. If the mesopentad fraction of the polypropylene-based resin is higher than 90.0%, the elastic modulus becomes high, and the heat resistance is also improved.

The polypropylene-based resin that forms the surface layer (B) of the biaxially oriented polypropylene film in the present invention has a mass average molecular weight (Mw) of preferably 200,000 or higher and 500,000 or lower.

If the Mw is lower than 200,000, the melt viscosity is low, and thus stability is not obtained at the time of casting, whereby the film formability might deteriorate. Meanwhile, if the Mw is higher than 500,000, the amount of a component having a molecular weight of 100,000 or lower is decreased, and the heat shrinkage rate at a high temperature is less likely to be decreased.

The lower limit of the Mw is more preferably 220,000 and further preferably 250,000. Meanwhile, the upper limit of Mw is more preferably 400,000, further preferably 360,000, and particularly preferably 330,000.

The polypropylene-based resin that forms the surface layer (B) of the biaxially oriented polypropylene film in the present invention has a number average molecular weight (Mn) of preferably 20,000 or higher and 200,000 or lower.

If the Mn is lower than 20,000, the melt viscosity is low, and thus stability is not obtained at the time of casting, whereby the film formability might deteriorate. Meanwhile, if the Mn is higher than 200,000, the heat shrinkage rate at a high temperature is less likely to be decreased.

The lower limit of the Mn is more preferably 30,000, further preferably 40,000, and particularly preferably 50,000. Meanwhile, the upper limit of the Mn is more preferably 80,000, further preferably 70,000, and particularly preferably 60,000.

Mw/Mn serves as an index of a molecular weight distribution. The Mw/Mn of the polypropylene-based resin that forms the surface layer (B) is preferably 3.2 or higher and 10 or lower. The Mw/Mn is more preferably 3.5 or higher and 8 or lower, further preferably 4.0 or higher and 6 or lower, and particularly preferably 4.5 or higher and 6 or lower. If the Mw/Mn is 3.2 or higher, the heat shrinkage rate at a high temperature is less likely to be decreased.

The molecular weight distribution of the polypropylene-based resin can be adjusted by: polymerizing components having different molecular weights in multiple stages by using a series of plant equipment; blending components having different molecular weights offline by using a kneader; performing polymerization through blending of catalysts having different performances; or using a catalyst with which a desired molecular weight distribution can be obtained.

The polypropylene-based resin that forms the surface layer (B) of the biaxially oriented polypropylene film in the present invention has a melt flow rate (MFR) at 230° C. and at 2.16 kgf. The MFR is preferably 1.0 g/10 min or higher and 8.0 g/10 min or lower.

The lower limit of the MFR of the polypropylene-based resin that forms the surface layer (B) is more preferably 1.5 g/10 min, further preferably 2.0 g/10 min, and particularly preferably 2.5 g/10 min. Meanwhile, the upper limit of the MFR of the polypropylene-based resin that forms the surface layer (B) is more preferably 8 g/10 min, further preferably 7 g/10 min, and even more preferably 6 g/10 min or lower.

If the Mw/Mn and the MFR of the polypropylene-based resin that forms the surface layer (B) are within the respective ranges, the adhesiveness to a cooling roll is favorable, advantageousness in forming suitable surface protrusions is achieved, the Martens hardness of the surface can be kept high, and the heat shrinkage rate at a high temperature can be kept low.

In the surface layer (B) of the biaxially oriented polypropylene film in the present invention, an additive or another resin may be contained. Examples of the additive include anti-blocking agents, antioxidants, ultraviolet absorbers, nucleating agents, tackiness agents, antifogging agents, flame retardants, inorganic or organic fillers, and the like. Examples of the other resin include: polypropylene resins other than the polypropylene resin used in the present invention; random copolymers each of which is a copolymer of propylene and ethylene and/or an α-olefin having four or more carbon atoms; various types of elastomers; and the like. These components may be successively polymerized by using a multistage reactor. Alternatively, these components may be blended with the polypropylene resin by using a Henschel mixer. Alternatively, master pellets made by using a melt-kneader in advance may be diluted with polypropylene so as to have a predetermined concentration. Alternatively, the entirety may be melt-kneaded in advance and used.

An anti-blocking agent to be contained in the surface layer (B) can be, as appropriate, selected and used from among anti-blocking agents in the forms of inorganic and organic particles. Among these anti-blocking agents, a silicon compound is particularly preferably used. Examples of the silicon compound can include silicates, silica, and compounds each having a main backbone formed by siloxane bonds. The particles may have spherical shapes or indefinite shapes. Among these particles, particles (silicone particles) made from acrylic acid and a compound having a main backbone formed by siloxane bonds are preferable. It has been found that: the silicone particles have excellent compatibility with and dispersibility in the polypropylene-based resin that forms the surface layer (B), thereby having excellent transparency; the silicone-based fine particles have excellent affinity for a coat layer or a vapor deposition layer provided on the surface layer (B); and the silicone-based fine particles lead to few repelled portions of the coat layer or have excellent adhesiveness to the vapor deposition layer.

The particles have an average particle diameter of preferably 1.0 μm or larger and 3.0 μm or smaller and more preferably 1.5 μm or larger and 2.7 μm or smaller. The average particle diameter mentioned herein is measured through the following method. That is, a photograph is taken with a scanning electron microscope, Feret diameters in the horizontal direction are measured by using an image analyzer device, and the average value of the Feret diameters is indicated as the average particle diameter.

The amount of the particles to be added is preferably 400 ppm or larger and 4000 ppm or smaller. The amount of the anti-blocking agent to be added is more preferably 400 ppm or larger and 2500 ppm or smaller, further preferably 800 ppm or larger and 2500 ppm, and particularly preferably 1200 ppm or larger and 2500 ppm or smaller. This addition is performed such that the number of the surface protrusions and the Martens hardness fall within the respective predetermined ranges. If the amount is 500 ppm or larger, the film has excellent slipperiness and blocking resistance. Meanwhile, if the amount is 4000 ppm or smaller, devitrification due to addition of an excessive amount of the anti-blocking agent is less likely to occur, and, at the time of forming a thin film layer through aluminum vapor deposition, coating, or the like, penetration of the thin film layer by the particles and forming the thin film on the side surfaces of the protrusions are less likely to occur, whereby deterioration of barrier properties and insufficient adhesion are less likely to occur.

In order to decrease the surface resistivity, the amount of a surfactant to be added is preferably 6000 ppm or smaller, more preferably 1500 ppm, further preferably 500 ppm, and particularly preferably 100 ppm or smaller.

(3) Biaxially Oriented Polypropylene Film

The biaxially oriented polypropylene film of the present invention may have: a two-layer structure composed of the surface layer (B) and the base material layer (A); a three-layer structure composed of the surface layer (B), an intermediate layer (C), and the base material layer (A) or composed of a first surface layer (B), the base material layer (A), and a second surface layer (B); a four-layer structure composed of the first surface layer (B), the base material layer (A), the intermediate layer (C), and the second surface layer (B); or a multi-layer structure composed of five or more layers. In a case where surface layers (B) are present on both surfaces of the film, one of the surface layers (B) is referred to as the second surface layer (B). However, the surface layers (B) may be made from the same resin or different resins.

The thickness of the entirety of the biaxially oriented polypropylene film in the present invention is preferably 1 μm or larger, more preferably 2 μm or larger, further preferably 5 μm or larger, even more preferably 10 μm or larger, and particularly preferably 15 μm or larger.

Meanwhile, the thickness of the entirety of the biaxially oriented polypropylene film in the present invention is preferably 100 μm or smaller, more preferably 8 or smaller, further preferably 60 μm or smaller, and even more preferably 50 μm or smaller.

In the biaxially oriented polypropylene film in the present invention, the ratio of the total thickness of the surface layer (B) to the thickness of the entire film is preferably 0.010 or higher, more preferably 0.020 or higher, further preferably 0.030 or higher, and particularly preferably 0.040 or higher.

In the biaxially oriented polypropylene film in the present invention, the ratio of the total thickness of the surface layer (B) to the thickness of the entire film is preferably 0.500 or lower, more preferably 0.400 or lower, further preferably 0.300 or lower, even more preferably 0.200 or lower, particularly preferably 0.115 or lower, and most preferably 0.110 or lower. If the ratio of the total thickness of the surface layer (B) to the thickness of the entire film is 0.500 or lower, the shrinkage rate becomes low, and thus the ratio of 0.500 or lower is preferable.

In the biaxially oriented polypropylene film in the present invention, the ratio of the thickness of the surface layer (B) to the thickness of the entire film is preferably 0.02 or higher and more preferably 0.030 or higher.

If the ratio of the thickness of the surface layer (B) to the thickness of the film is 0.02 or higher, the adhesiveness to a vapor deposition layer, a coat layer, or an adhesive layer is improved.

Meanwhile, in the biaxially oriented polypropylene film in the present invention, the ratio of the thickness of the surface layer (B) to the thickness of the entire film is preferably 0.08 or lower, more preferably 0.07 or lower, further preferably 0.06 or lower, and even more preferably 0.055 or lower. If the ratio of the thickness of the surface layer (B) to the thickness of the entire film is 0.08 or lower, the shrinkage rate becomes low, and thus the ratio of 0.08 or lower is preferable.

The ratio of the thickness of the base material layer (A) or the total thickness of the base material layer (A) and the intermediate layer (C) to the thickness of the entirety of the film is preferably 0.50 or higher and 0.99 or lower, further preferably 0.60 or higher and 0.97 or lower, particularly preferably 0.7 or higher and 0.90% or lower, and most preferably 0.80 or higher and 0.92 or lower.

(4) Manufacturing Method

The biaxially oriented polypropylene film of the present invention can be obtained as follows. That is, a polypropylene-based resin composition for forming the base material layer (A) and a polypropylene-based resin composition for forming the surface layer (B) are melt-extruded by separate extruders, co-extruded from a die, and cooled by a cooling roll so as to be formed as an unstretched sheet, the unstretched sheet is stretched in a machine direction (MD) and a transverse direction (TD), and then heat setting treatment is performed on the stretched sheet. The extrusion is preferably performed such that the surface layer (B) comes into contact with the cooling roll. If the surface layer (B) forms a surface on the opposite side to the surface in contact with the cooling roll, the polypropylene resin forming the surface layer (B) is slowly cooled and comes to have a high degree of crystallinity, whereby the arithmetic average roughness (Ra) of the surface of the surface layer (B) might become excessively large owing to surface unevenness caused by spherulites.

The temperature for the melt-extrusion is preferably about 200 to 280° C. In order to obtain a laminate film having a good appearance without any disarray of the layers in this temperature range, the difference in viscosity (MFR difference) between the polypropylene-based resin composition for forming the base material layer (A) and the polypropylene-based resin composition for forming the surface layer (B) is preferably set to 6.5 g/10 minutes or smaller. However, if the difference in viscosity is larger than 5.0 g/10 minutes, disarray of the layers easily occurs and easily results in a poor appearance. The difference in viscosity is more preferably 4.0 g/10 minutes or smaller and further preferably 3.0 g/10 minutes or smaller.

The surface temperature of the cooling roll is preferably 25 to 50° C. and more preferably 30 to 45° C. If the temperature of the cooling roll is 50° C. or lower, the degree of crystallinity of the polypropylene-based resin does not become excessively high, and the arithmetic average roughness (Ra) of the surface of the surface layer (B) is less likely to become high owing to surface unevenness due to spherulites formed.

The lower limit of the stretching ratio in the machine direction (MD) is preferably 4 times and more preferably 4.2 times. If the stretching ratio in the MD is 4 times or higher, unevenness in the film thickness is less likely to occur. Meanwhile, the upper limit of the stretching ratio in the MD is preferably 8 times and more preferably 7 times. If the stretching ratio in the MD is 8 times or lower, the subsequent stretching in the transverse direction becomes easy to perform. The lower limit of the stretching temperature in the MD is preferably 118° C., more preferably 120° C., and further preferably 122° C. If the stretching temperature in the MD is 118° C. or higher, mechanical load is less likely to become high, the extent of unevenness in the thickness is less likely to become large, and the surfaces of the film are less likely to be roughened. Meanwhile, the upper limit of the stretching temperature in the MD is preferably 135° C., more preferably 132° C., and further preferably 128° C. The stretching temperature being high is preferable in terms of decrease of the heat shrinkage rate, but might lead to: adhesion to the roll, resulting in inability to perform stretching; and roughening of a surface.

The lower limit of the stretching ratio in the transverse direction (TD) is preferably 7 times, more preferably 7.5 times, and further preferably 8 times. If the stretching ratio in the TD is 7 times or higher, the extent of unevenness in the thickness is less likely to become large. Meanwhile, the upper limit of the stretching ratio in the TD is preferably 15 times, more preferably 12 times, and further preferably 10 times. If the upper limit is exceeded, the heat shrinkage rate might become high, or the film might be broken at the time of stretching.

The preheating temperature for stretching in the TD is preferably set to be higher than the stretching temperature by 10 to 20° C. in order to swiftly increase the temperature of the film to a temperature near the stretching temperature. The lower limit of the stretching temperature in the TD is preferably 150° C., more preferably 152° C., further preferably 154° C., and particularly preferably 156° C. If the stretching temperature in the TD is 150° C. or higher, the film is easily softened sufficiently, and is less likely to be broken and less likely to have a high heat shrinkage rate. Meanwhile, the upper limit of the stretching temperature in the TD is preferably 164° C., more preferably 162° C., and further preferably 160° C. The stretching temperature is preferably set to be high in order to decrease the heat shrinkage rate. However, if the stretching temperature is 170° C. or higher, melting of a low-molecular-weight component and decrease in orientation due to recrystallization are less likely to occur, and roughening of a surface and whitening of the film are also less likely to occur.

The stretched film is heat-set. The lower limit of the heat-setting temperature is preferably 168° C., more preferably 170° C., and further preferably 173° C. If the heat-setting temperature is 168° C. or higher, the heat shrinkage rate is less likely to become high, whereby it is unnecessary to perform processing for a long time in order to decrease the heat shrinkage rate. Meanwhile, the upper limit of the heat-setting temperature is preferably 180° C. and more preferably 178° C. If the heat-setting temperature is 180° C. or lower, melting of a low-molecular-weight component and decrease in orientation due to recrystallization are less likely to occur, and roughening of a surface and whitening of the film are also less likely to occur.

At the time of heat-setting, mitigation (relaxation) is preferably caused. The lower limit of the relaxation rate is preferably 2%, more preferably 3%, and further preferably 5%. If the relaxation rate is 2% or higher, the heat shrinkage rate is less likely to become high. Meanwhile, the upper limit of the relaxation rate is preferably 10% and more preferably 8%. If the relaxation rate is 10% or lower, the extent of unevenness in the thickness is less likely to become large.

Furthermore, after the film manufactured through the above process is temporarily wound into the shape of a roll, the roll may also be annealed offline in order to decrease the heat shrinkage rate.

The obtained biaxially oriented polypropylene film thus obtained is, as necessary, subjected to corona discharge, plasma treatment, flame treatment, or the like, and then, wound with a winder, whereby a biaxially oriented polypropylene film roll in the present invention can be obtained.

(Film Properties)

The biaxially oriented polypropylene film in the present invention is characterized by having the following properties. Here, in the biaxially oriented polypropylene film in the present invention, the "machine direction" refers to a direction corresponding to the direction of flow in the film manufacturing process, and the "transverse direction" refers to a direction perpendicular to the aforementioned direction of flow in the film manufacturing process. Regarding a polypropylene film for which the direction of flow in the film manufacturing process is uncertain, the "machine direction" and the "transverse direction" are defined as follows That is, wide-angle X-rays are caused to enter a film surface in a direction perpendicular thereto, and a scattering peak derived from a (110) plane of α-type crystal is scanned in the circumferential direction so as to obtain a diffraction intensity distribution in which: a direction with the diffraction intensity being highest is defined as the "machine direction"; and a direction perpendicular thereto is defined as the "transverse direction".

The number of protrusions of 500 om or larger in a surface area of 2000 $\mu m^2$ on the surface of the surface layer (B) of the biaxially oriented polypropylene film in the present invention is counted with a three-dimensional roughness meter. The number of the protrusions on the surface of the surface layer (B) is preferably 50 or larger and 200 or smaller. The number of the protrusions on the surface of the surface layer (B) is more preferably 60 or larger, further preferably 70 or larger, even further preferably 80 or larger, particularly preferably 100 or larger, and particularly preferably 120 or larger. If the number of the protrusions of 500 nm or larger is 50 or larger, the slipperiness of the film and the blocking resistance are excellent, and hence, the film winding quality is excellent.

The number of the protrusions of 500 nm or larger on the surface of the surface layer (B) is more preferably 180 or smaller, further preferably 170 or smaller, and particularly preferably 160 or smaller. If the number of the protrusions of 500 nm or larger is 200 or smaller, when an aluminum vapor deposition layer or a coat layer is stacked, penetration of the aluminum vapor deposition layer or the coat layer by the protrusions and a failure to form the aluminum vapor deposition layer or the coat layer on the side surfaces of the protrusions are less likely to occur, and the adhesiveness is easily improved. The size of the protrusions and the number of the protrusions on the surface of the surface layer (B) can be set to fall within the respective predetermined ranges through any of several methods. For example, the size and the number can be adjusted according to the type, the average particle diameter, and the addition amount of the anti-blocking agent.

(Wetting Tension)

The surface of the surface layer (B) of the biaxially oriented polypropylene film in the present invention has a wetting tension of preferably 38 mN/m or higher. If the wetting tension is 38 mN/m or higher, the adhesiveness to a vapor deposition film, a coating film, or an adhesive agent used for lamination with another member film is improved. In order to set the wetting tension to be 38 mN/m or higher, an additive such as an antistatic agent or a surfactant is ordinarily used. However, such a method has the effect of decreasing a surface resistance value. Considering this, a physicochemical surface treatment such as corona treatment or flame treatment is preferably performed.

For example, in the corona treatment, electric discharge is preferably performed in air by using a preheating roll or a treatment roll. The wetting tension is preferably 44 mN/m or lower, more preferably 43 mN/m or lower, and further preferably 42 mN/m or lower.

(Martens Hardness)

The surface layer (B) of the biaxially oriented polypropylene film in the present invention has a Martens hardness of preferably 350 $N/mm^2$ or lower, more preferably 340

N/mm$^2$ or lower, further preferably 320 N/mm$^2$ or lower, particularly preferably 310 N/mm$^2$ or lower, and most preferably 300 N/mm$^2$ or lower.

If the Martens hardness is 350 N/mm$^2$ or lower, adhesion force between a vapor deposition layer or a coat layer and the surface of the surface layer (B) is improved. Furthermore, even when the ratio of the thickness of the surface layer (B) to the thickness of the film is made low, the adhesiveness is easily improved. The Martens hardness can be set to be 350 N/mm$^2$ or lower by adding ethylene and/or an α-olefin having four or more carbon atoms, or another copolymerization component. Alternatively, the Martens hardness can be decreased also by decreasing the stretching ratios of the film and decreasing the orientation of molecular chains.

Meanwhile, the surface layer (B) of the biaxially oriented polypropylene film in the present invention has a Martens hardness of preferably 150 N/mm$^2$ or higher, more preferably 180 N/mm$^2$ or higher, further preferably 220 N/mm$^2$ or higher, even more preferably 240 N/mm$^2$ or higher, and still even more preferably 260 N/mm$^2$ or higher.

The Martens hardness of the surface of the surface layer (B) indicates the hardness of the surface layer (B) obtained when the surface is stuck, by about 0.1 μm, with a needle tip having a curvature radius of 0.1 μm or smaller by using a dynamic ultra-microhardness tester. The feature of having a high Martens hardness indicates that the surface layer (B) is hard. Said feature leads to maintaining of a state where: the protrusion portion formed on the surface of the surface layer (B) is recessed to only a small extent; and the area of contact between the surface layer (B) and another surface layer is small. Thus, said feature leads to improvement of the slipperiness and the blocking resistance, and hence, improvement of the film winding quality.

(Arithmetic Average Roughness (Ra))

The surface of the surface layer (B) of the biaxially oriented polypropylene film in the present invention has an arithmetic average roughness (Ra) of preferably 1.5 nm or larger and 3.0 nm or smaller. The arithmetic average roughness (Ra) is more preferably 2.9 nm or smaller, further preferably 2.8 nm or smaller, and particularly preferably 2.7 nm or smaller. If the arithmetic average roughness (Ra) is 3.0 nm or smaller, a failure part to form a vapor deposition layer or a coat layer on the protrusion portion is less likely to occur, and the gas barrier properties and the like are excellent.

Meanwhile, the arithmetic average roughness (Ra) of the surface of the surface layer (B) is more preferably 1.8 nm or larger, further preferably 2.0 nm or larger, particularly preferably 2.2 nm or larger, and most preferably 2.3 nm or larger. If the arithmetic average roughness (Ra) is 1.5 nm or larger, the adhesiveness to a vapor deposition layer or a coat layer is improved, and the gas barrier properties and the like are excellent.

(Surface Resistance Value)

The surface of the surface layer (B) of the biaxially oriented polypropylene film in the present invention has a surface resistance value of more preferably 14 Log Ω or larger in terms of the adhesiveness to a vapor deposition film, a coating film, or an adhesive agent. The surface resistance value is further preferably 14.5 Log Ω or larger and particularly preferably 15 Log (or larger. To this end, it is preferable that the surfactant and antifogging agents are not excessively contained. Meanwhile, the surface resistance value is preferably 18 Log Ω or smaller and more preferably 17 Log Ω or smaller.

(Haze)

The biaxially oriented polypropylene film in the present invention has a haze of preferably 6.0% or lower, more preferably 0.2% or higher and 5.0% or lower, further preferably 0.3% or higher and 4.5%, and particularly preferably 0.4% or higher and 4.0%. If the haze is within the above range, the biaxially oriented polypropylene film becomes easy to use in a situation in which transparency is required. The haze tends to deteriorate in cases such as: a case where the stretching temperature and the heat-setting temperature are excessively high; a case where the temperature of the cooling roll is high, and the cooling speed of an unstretched (raw film) sheet is low; and a case where the amount of a low-molecular-weight component is excessively large. The haze can be set to fall within the above range by adjusting these conditions.

(Tensile Elastic Moduli)

The biaxially oriented polypropylene film in the present invention has a tensile elastic modulus, in the machine direction, of preferably 1.5 GPa or higher and 5.0 GPa or lower, more preferably 1.8 GPa or higher and 5.0 GPa or lower, further preferably 2.0 GPa or higher and 4.0 GPa or lower, and particularly preferably 2.1 GPa or higher and 3.5 GPa or lower.

The biaxially oriented polypropylene-based film in the present invention has a tensile elastic modulus, in the transverse direction, of preferably 3.0 GPa or higher and 8.0 GPa or higher, more preferably 3.2 GPa or higher and 7.0 GPa or lower, further preferably 3.5 GPa or higher and 6.5 GPa or lower, particularly preferably 3.8 GPa or higher and 6.5 GPa or lower, and most preferably 4.0 GPa or higher and 6.5 GPa or lower.

If the tensile elastic moduli are within the above respective ranges, the stiffness becomes high, and the film can be used even if the thickness thereof is small, whereby the amount of the film to be used can be decreased. A measurement method for each tensile elastic modulus will be described later.

(Heat Shrinkage Rate)

The biaxially oriented polypropylene film in the present invention has a heat shrinkage rate in the machine direction at 150° C. of preferably 0.2 or higher and 15.0% or lower, more preferably 0.3% or higher and 13.0% or lower, further preferably 0.5% or higher and 9.0% or lower, and particularly preferably 1.0% or higher and 8.0% or lower. A film in which the heat shrinkage rate in the machine direction at 150° C. is within the above range can be considered to be a film having excellent heat resistance and can be used also in a situation in which the film might be exposed to a high temperature. The heat shrinkage rate in the machine direction at 150° C. can be controlled to be up to about 1.5% by, for example, increasing the amount of a low-molecular-weight component or adjusting a stretching condition and a heat-setting condition.

The biaxially oriented polypropylene film in the present invention has a heat shrinkage rate in the transverse direction at 150° C. of preferably 0.5% or higher and 20.0% or lower, more preferably 1.0% or higher and 15.0% or lower, further preferably 1.5% or higher and 10.0% or lower, and particularly preferably 2.0% or higher and 8.0% or lower. A film in which the heat shrinkage rate in the transverse direction at 150° C. is within the above range can be considered to be a film having excellent heat resistance and can be used also in a situation in which the film might be exposed to a high temperature. The heat shrinkage rate in the transverse direction at 150° C. can be controlled to be up to about 1.5% by, for example, increasing the amount of a low-molecular-weight component or adjusting a stretching condition and a heat-setting condition.

(Laminate Film)

In order to improve the gas barrier properties and designability of the biaxially oriented polypropylene film in the present invention, a vapor deposition layer or a coat layer is preferably provided.

Examples of the material of the vapor deposition layer include aluminum, $Al_2O_3$, SiOx (X<2), a mixture of $Al_2O_3$ and SiO2, a mixture of Al and SiO2, and the like.

Examples of the material of the coat layer include polyvinylidene chloride, nylon, ethylene-vinyl alcohol copolymers, polyvinyl alcohol, and the like. The vapor deposition layer and the coat layer are preferably thin film layers. In the case of the vapor deposition layer, the thickness thereof is preferably 5 to 40 nm and more preferably 10 to 30 nm. In the case of the coat layer, the amount of the coat is preferably 0.05 to 0.5 g/$m^2$ and more preferably 0.10 to 0.3 g/$m^2$.

The vapor deposition layer provided on a surface of the biaxially oriented polypropylene film in the present invention preferably peels only partially and more preferably does not peel at all. Meanwhile, the coat layer provided on a surface of the biaxially oriented polypropylene film in the present invention preferably has repelled portions only partially and more preferably does not have any repelled portions.

(Method for Producing Vapor Deposition Layer)

For production of the vapor deposition layer, a publicly-known production method such as a chemical vapor deposition (CVD) method or a physical vapor deposition (PVD) method such as a vacuum deposition method, a sputtering method, or an ion plating method is employed as appropriate. Among these methods, a physical vapor deposition method is preferable, and a vacuum deposition method is more preferable. For example, in the vacuum deposition method, aluminum, $Al_2O_3$, SiOx (X<2), a mixture of $Al_2O_3$ and SiO2, a mixture of Al and SiO2, or the like may be used as a raw material to be vapor-deposited, and resistive heating, high frequency induction heating, electron beam heating, or the like may be employed as the type of heating. In addition, oxygen, nitrogen, water vapor, or the like may be introduced as a reactive gas, or reactive vapor deposition may be performed by means of ozone addition, ion assist, or the like. In addition, a bias or the like may be applied to the film base material, the temperature of the film base material may be increased or decreased, or other production conditions may be changed unless the object of the present invention is impaired by doing so. The same applies to other production methods such as a sputtering method or a CVD method.

Use of the biaxially oriented polypropylene film in the present invention is not limited to packaging, and the biaxially oriented polypropylene film can also be used as an insulating film for a capacitor, a motor, or the like or as a base film for a back sheet of a solar cell.

(Laminated Body)

It is preferable to process a laminated body into a packaging bag. The laminated body is composed of: the biaxially oriented polypropylene film in the present invention or a film obtained by providing the vapor deposition layer or the coat layer onto the biaxially oriented polypropylene film; and an unstretched film, a uniaxially stretched film, or a biaxially stretched film each made from low-density polyethylene, linear low-density polyethylene, an ethylene-vinyl acetate copolymer, polypropylene, or polyester.

(Method for Manufacturing Laminate Layered Body)

By using a laminated body in which a polyolefin-based resin layer having heat sealability provided on the biaxially oriented polypropylene film in the present invention, it is possible to manufacture a packaging container having excellent filling-and-packaging suitability, preservation suitability, and the like for food and drink products, pharmaceutical products, chemical products and cosmetic products such as detergents, shampoos, oils, tooth pastes, adhesive agents, and tackiness agents, and other various products.

As the polyolefin-based resin layer having heat sealability, a film or a sheet made from a resin capable of being melted by heat such that portions thereof are fused to each other can be used. Specifically, a film or a sheet made from an acid-modified polyolefin resin, a polyvinyl acetate-based resin, a poly(meth)acrylic-based resin, a polyvinyl chloride-based resin, or another one of various types of resins can be used, for example. The acid-modified polyolefin resin is obtained by modifying, with an unsaturated carboxylic acid such as acrylic acid, methacrylic acid, maleic acid, maleic anhydride, fumaric acid, or itaconic acid, a polyolefin-based resin such as low-density polyethylene, medium-density polyethylene, high-density polyethylene, straight chain (linear) low-density polyethylene, polypropylene, an ethylene-vinyl acetate copolymer, an ionomer resin, an ethylene-acrylic acid copolymer, an ethylene-ethyl acrylate copolymer, an ethylene-methacrylic acid copolymer, an ethylene-methyl methacrylate copolymer, an ethylene-propylene copolymer, a methylpentene polymer, a polybutene polymer, polyethylene, or polypropylene. A representative film or sheet is a film or a sheet made from straight chain (linear) low-density polyethylene or polypropylene.

The laminate layered body has an oxygen permeability at a temperature of 23° C. and at a relative humidity of 65%. The upper limit of the oxygen permeability is preferably 50 mL/$m^2$/day/MPa, more preferably 30 mL/$m^2$/day/MPa, further preferably 20 mL/$m^2$/day/MPa, and particularly preferably 15 mL/$m^2$/day/MPa. If the upper limit of the oxygen permeability is 50 mL/$m^2$/day/MPa, excellent preservability is exhibited for substances and food that degrade owing to oxygen. The lower limit of the oxygen permeability of the laminate polypropylene film at a temperature of 23° C. and at a humidity of 65% is not particularly limited but is preferably 0.1 mL/$m^2$/day/MPa. Also, 0.1 mL/$m^2$/day/MPa is regarded as a lower limit from the viewpoint of manufacturing.

EXAMPLES

Hereinafter, the present invention will be further described in detail by means of Examples, but Examples described below do not limit the present invention, and any modifications made within the scope of the gist of the present invention are included in the present invention.

(Measurement Methods)

Measurement methods for physical properties of raw materials used in Examples and Comparative Examples and films obtained in the Examples and Comparative Examples are as follows.

1) Mesopentad Fraction ([mmmm], Unit: %)

Each mesopentad fraction was measured by using 13C-NMR. The mesopentad fraction was calculated according to the method described in A. Zambelli, et al., "Macromolecules", vol. 6, page 925 (1973). The 13C-NMR measurement was performed at 110° C. by using "AVANCE 500" manufactured by Bruker Corporation, with 200 mg of a sample dissolved at 135° C. in a liquid mixture obtained by mixing o-dichlorobenzene and heavy benzene in a volume ratio of 8:2.

2) Melt Flow Rate ([MFR], g/10 min)

Measurement was performed at a temperature of 230° C. and at a load of 2.16 kgf according to JIS K 7210.

In the case of a raw material resin, a necessary amount of pellets (powder) thereof was directly weighed out and used.

In the case of a film, a necessary amount of the film was cut out and then cut into an about 5-mm square sample, and the sample was used.

3) Molecular Weight and Molecular Weight Distribution

A molecular weight and a molecular weight distribution of each of raw material resins and films were obtained based on monodisperse polystyrene through gel permeation chromatography (GPC). Measurement conditions such as a column and a solvent used in the GPC measurement are as follows.

Solvent: 1,2,4-trichlorobenzene

Column: TSKgel GMHHR-H (20) HT×3

Flow rate: 1.0 ml/min

Detector: RI

Measurement temperature: 140° C.

A number average molecular weight (Mn), a mass average molecular weight (Mw), and a molecular weight distribution (Mw/Mn) are defined by the following expressions with use of the number of molecules ($N_i$) based on a molecular weight ($M_i$) at each elution position on a GPC curve obtained via a molecular weight calibration curve.

Number average molecular weight: $Mn=\Sigma(N_i \cdot M_i)/\Sigma N_i$

Mass average molecular weight: $Mw=\Sigma(N_i \cdot M_i^2)/\Sigma(N_i \cdot M_i)$ Molecular weight distribution: Mw/Mn When the baseline was not clear, a baseline was set within a range extending to the lowest position of the high-molecular-weight-side skirt of the high-molecular-weight-side elution peak closest to the elution peak of a standard substance.

4) Melting Peak Temperature (° C.), Melting Peak Area (J/g)

Measurement was performed with the sample amount being 10 mg and with the temperature increase speed being 20° C./min by using a differential scanning calorimeter (DSC) manufactured by Seiko Instruments Inc. A melting endothermic peak temperature and a melting peak area were obtained from the DSC curve.

5) Thickness (μm)

The thickness of each of the base material layer (A) and the surface layer (B) was measured as follows. That is, each of biaxially stretched laminate polypropylene-based films was solidified with a modified urethane resin, the resultant film was cut with a microtome to obtain a cross section thereof, and the cross section was observed with a differential interference microscope.

6) Haze (%)

Measurement was performed at 23° C. according to JIS K 7105. The measurement was performed by using a haze meter (300A manufactured by NIPPON DENSHOKU INDUSTRIES Co., Ltd.). The measurement was performed two times, and the average value of the obtained measurement values was obtained.

7) Tensile Elastic Modulus (GPa)

Measurement was performed according to JIS K 7127. Each of films was cut in each of the machine direction and the transverse direction by using a razor, into a sample having a width of 10 mm and a length of 180 mm, and the sample was used. The sample was left at rest for 12 hours in an atmosphere of 23° C. and a relative humidity of 65%, and then measurement was performed in an atmosphere of 23° C. and a relative humidity of 65% under the conditions that the distance between chucks was 100 mm and the tensile speed was 200 mm/min. The average value of measurement results obtained through five times of the measurement was used. As a measurement device, AUTOGRAPH AG5000A manufactured by Shimadzu Corporation was used.

8) Heat Shrinkage Rate

Measurement was performed through the following method according to JIS Z 1712. That is, each of the films was cut in each of the machine direction and the transverse direction of the film, into a sample having a width of 20 mm and a length of 200 mm. The sample was hung in a 150° C.-hot-air oven and heated for 5 minutes. The length of the sample after heating was measured, and the proportion of the post-shrinkage length to the original length of the sample was obtained as a heat shrinkage rate.

9) Wetting Tension (mN/m)

According to K 6768:1999, each of the films was aged for 24 hours at 23° C. and at a relative humidity of 50%, and then measurement was performed on the surface of the first surface layer (B) of the film through the following procedure.

Step 1)

Measurement was performed in a standard laboratory atmosphere (see JIS K 7100) of a temperature of 23° C. and a relative humidity of 50%.

Step 2)

A test piece of the film was placed on a substrate of a hand coater (4.1), and several drops of a test liquid mixture were dripped on the test piece and immediately spread by drawing a wire bar.

In the case of spreading the test liquid mixture by using a swab or a brush, the liquid was swiftly spread at least over an area of 6 $cm^2$ or larger. Such an amount of the liquid as to form a thin layer without pooling was spread.

The liquid film of the test liquid mixture was observed in a bright place, and the wetting tension was determined on the basis of the state, of the liquid film, taken three seconds later. In a case where the liquid film was, without being torn, maintained for three seconds or longer to be in a state taken when the test liquid mixture had been applied, the test piece was regarded as being wet. In the case where the wet state was maintained for three seconds or longer, a liquid mixture having the highest surface tension next to the liquid mixture just used was further used. In contrast, in a case where the liquid film was torn within three seconds, a liquid mixture having the lowest surface tension next to the liquid mixture just used was further used.

This operation was repeated, and a liquid mixture capable of wetting the surface of the test piece for exactly three seconds was selected.

Step 3)

In each test, a new swab was used. A brush or a wire bar was washed with methanol and dried each time of use since residual liquid thereon could change the composition and the surface tension as a result of evaporation of the residual liquid.

Step 4)

The operation of selecting a liquid mixture capable of wetting the surface of the test piece for three seconds was performed at least three times. The surface tension of the liquid mixture selected in this way was reported as the wetting tension of the film.

10) Martens Hardness (N/$mm^2$)

Each of the obtained films was cut into an about 2-cm square sample, and a surface opposite to a measurement surface of the sample was fixed on a glass sheet having a thickness of about 1 mm by using a tackiness agent. Then, the sample was left at rest for 12 hours in an atmosphere of 23° C. and a relative humidity of 50%, whereby the humidity thereof was adjusted. The measurement surface was the first surface layer (B). This sample was subjected to measurement under the following measurement conditions through a method based on ISO14577-1 (2002) by using a dynamic ultra-microhardness tester ("DUH-211" manufactured by Shimadzu Corporation). The measurement was performed ten times at respective different positions on the film, to obtain ten values. Among the ten values, the largest and smallest values were excluded. The average value of the remaining eight values was obtained.

<Measurement Conditions>

(Setting)

Measurement environment: at a temperature of 23° C. and at a relative humidity of 50%

Test mode: loading-unloading testing

Indenter used: a triangular pyramid indenter having an angle between edges of 115 degrees Indenter elastic modulus: 1.140×106 N/mm$^2$ Indenter Poisson's ratio: 0.07

Cf-Ap, As correction: performed (Conditions)

Test force: 0.10 mN

Load speed: 0.0050 m N/sec

Loading-maintaining time: 5 sec

Unloading-maintaining time: 0 sec

11) Number of Protrusions

In each of the obtained films, the number of protrusions of 500 nm or larger in a surface area of 2000 μm$^2$ on the first surface layer (B) was obtained as follows. That is, measurement was performed by using a three-dimensional roughness meter (manufactured by Kosaka Laboratory Ltd., with a model number ET-30HK) under the conditions that: the stylus pressure was 20 mg; the X-direction-measurement length was 1 mm; the feeding speed was 100 μm/sec; the Y-direction-feeding pitch was 2 μm; the number of recording lines was 99; the height-direction magnification was 20000-fold, and 80-μm cutoff was performed. Then, the height relative to the reference height was calculated, and the number of protrusions of 500 nm or larger was counted.

Counting of the number of the protrusions was performed three times, and evaluation was made on the basis of the average value of the obtained numbers.

12) Arithmetic Average Roughness (Ra) (nm)

In each of the obtained films, the arithmetic average roughness (Ra) of the surface of the first surface layer (B) was measured by using a scanning probe microscope ("SPM-9700" manufactured by Shimadzu Corporation). In a dynamic mode, measurement was performed within a range in which both measurement lengths in the X and Y directions were 2 μm, and the obtained image was corrected (such that the tilt was adjusted, and line fitting and noise line removal were achieved). Then, an arithmetic average roughness was obtained according to the definition of the arithmetic average roughness described in JIS-B0601 (1994).

13) Surface Resistance Value (Log Ω)

According to JIS K 6911, each of the films was aged at 23° C. for 24 hours, and then measurement was performed on the surface of the first surface layer (B) of the film.

14) Evaluation regarding Wrinkles on Film Roll

Each of formed biaxially oriented polypropylene films was wound so as to have a width of 600 mm and a winding length of 1500 m, and determination was performed through visual evaluation regarding wrinkles on the roll surface layer according to the following criteria. In the case of being evaluated as "Excellent" or "Good", the biaxially oriented polypropylene film was determined to be acceptable.

Excellent: no wrinkles were present.

Good: moderate wrinkles were present, but the wrinkles were removed when the film was drawn out and then applying a tension of about 5 N/m to the drawn-out film.

Not good: moderate wrinkles were present, but the wrinkles were removed when the film was drawn out and then applying a tension of about 20 N/m to the drawn-out film.

Bad: deep wrinkles were present, and the wrinkles were not even removed when the film was drawn out and then applying the tension of about 20 N/m to the drawn-out film.

15) Evaluation of Coating Suitability

A butanediol vinyl alcohol copolymer (Nichigo G-Polymer OKS-8049 manufactured by Nippon Synthetic Chemical Industry Co., Ltd.) was dissolved in an aqueous solution containing 15% of isopropyl alcohol, whereby a coat solution having a solid concentration of 5% was prepared. The prepared coat solution was dripped on the first surface layer (B) of a film cut out the film roll, and the first surface layer (B) was coated with the coat solution by using a No. 3 Meyer bar such that the amount of the coat became 0.2 g/m$^2$ in a dried state. Then, the solution was sufficiently volatilized with a dryer, and visual evaluation regarding repelled portions of the coat layer was made. In the case of being evaluated as "Excellent" or "Good", the film was determined to be acceptable.

Excellent: the coat layer had no repelled portion.

Good: 90% of the coat layer was free of repelled portions, but a small amount of minute repelled portions was present.

Not good: the coat layer partially had repelled portions, and the proportion of the area free of repelled portions in the coat layer was lower than 90%

Bad: the coat layer had repelled portions over the entire surface.

16) Evaluation Regarding Adhesion of Aluminum Vapor Deposition Film

On the first surface layer (B) of a film drawn out from the film roll, aluminum was vapor-deposited by using a small-sized vacuum deposition device (VWR-400/ERH manufactured by ULVAC KIKO, Inc.) such that the film thickness of the aluminum was 30 nm. Sellotape (registered trademark) manufactured by NICHIBAN Co., Ltd. and having a width of 18 mm was pasted on the vapor deposition surface of the obtained vapor deposition film, and the adhesion state of the aluminum vapor deposition film was evaluated through a 90-degree peel method. In the case of being evaluated as "Good", the film was determined to be acceptable.

Good: the aluminum vapor deposition film was not peeled.

Not good: the aluminum vapor deposition film was partially peeled.

Bad: the aluminum vapor deposition film was peeled over the entire surface.

(Raw Material Resins)

The details of raw materials of polypropylene-based resins used in Examples and Comparative Examples described below and film formation conditions in the Examples and the Comparative Examples are indicated in Tables 1 to 3.

In a masterbatch containing silicone particles used as an anti-blocking agent indicated in Table 2, a propylene homopolymer having an Mn of 56,000, an Mw of 310,000, an MFR of 2.5 g/10 min, and a mesopentad fraction

[mmmm] of 94.8% (NOVATEC (registered trademark) PP "FL203D" manufactured by Japan Polypropylene Corporation and having a copolymerization monomer content of 0 mol %; hereinafter, abbreviated as "PP-1") indicated in Table 1 was used as a polypropylene resin, the silicone particles used as an anti-blocking agent were set to have a particle diameter of 2.0 μm, and the anti-blocking agent content was set to 50,000 ppm. In addition, in a masterbatch containing silica particles indicated in Table 2, the silica particles were set to have a particle diameter of 2.7 μm, and the anti-blocking agent content was set to 50,000 ppm.

TABLE 1

| Polypropylene-based resin | PP-1 | PP-2 | PP-3 | PP-4 | PP-5 | PP-6 |
|---|---|---|---|---|---|---|
| Raw material monomer | propylene | propylene | propylene | propylene, ethylene | propylene | propylene |
| Type of raw material | FL203D | FS2012 | FLX80E4 | WFX4M | FL4 | F300SP |
| Resin stereoregularity (mesopentad fraction (%)) | 94.8 | 99.2 | 98.9 | not measurable | 98.4 | 93.8 |
| Ethylene copolymerization amount (mol %) | 0.0 | 0.0 | 0.0 | 3.0 | 0.0 | 0.0 |
| Molecular weight (Mw) | 310,000 | 320,000 | 240,000 | 220,000 | 300,000 | 310,000 |
| Molecular weight (Mn) | 56,000 | 81,000 | 65,000 | 80,000 | 55,000 | 59,000 |
| Molecular weight distribution (Mw/Mn) | 5.6 | 4.0 | 3.7 | 2.7 | 5.5 | 5.3 |
| MFR (g/10 min, at 230° C. and 2.16 kgf) | 2.5 | 2.2 | 7.5 | 7.0 | 5.6 | 3.2 |
| DSC melting peak temperature (° C.) | 160.8 | 162.7 | 162.4 | 125.3 | 163.2 | 158.6 |
| DSC melting peak area (J/g) | 99.2 | 93.0 | 94.6 | 64.3 | 98.1 | 92.6 |

TABLE 2

| Masterbatch | A | B |
|---|---|---|
| Product name of masterbatch | EX-5N00706H | FTX0627G |
| Anti-blocking agent in masterbatch | silicone particle | silica particle |
| Average particle diameter of anti-blocking agent (μm) | 2.0 | 2.7 |
| Anti-blocking agent content of masterbatch (ppm by weight) | 50,000 | 50,000 |
| MFR of polypropylene resin in masterbatch (g/10 mm, at 230° C. and 2.16 kgf) | 2.5 | 2.5 |

TABLE 3

| Film formation condition | a | b | c |
|---|---|---|---|
| Temperature of melted resin (° C.) | 250 | 250 | 250 |
| Temperature of cooling roll (° C.) | 40 | 30 | 30 |
| Stretching ratio in machine direction (times) | 4.5 | 4.5 | 4.5 |
| Stretching temperature in machine direction (° C.) | 125 | 125 | 125 |
| Stretching ratio in transverse direction (times) | 8.2 | 8.2 | 8.2 |
| Preheating temperature for stretching in transverse direction (° C.) | 174 | 168 | 175 |
| Stretching temperature in transverse direction (° C.) | 158 | 155 | 166 |
| Heat-setting temperature (° C.) | 175 | 165 | 171 |
| Relaxation rate in transverse direction (%) | 6.7 | 6.7 | 6.7 |

Example 1

For a base material layer (A), a raw material resin obtained as follows was used. That is, a propylene homopolymer having an Mn of 81,000, an Mw of 320,000, an MFR of 2.2 g/10 min, and a mesopentad fraction [mmmm] of 99.2% (PP "FS2012" manufactured by Sumitomo Chemical Co., Ltd. and having a copolymerization monomer content of 0 mol %; hereinafter, abbreviated as "PP-2") indicated in Table 1 and a propylene homopolymer having an Mn of 65,000, an Mw of 240,000, an MFR of 7.5 g/10 min, and a mesopentad fraction [mmmm] of 98.9% (PP "FLX80E4" manufactured by Sumitomo Chemical Co., Ltd. and having a copolymerization monomer content of 0 mol %; hereinafter, abbreviated as "PP-3") indicated in Table 1 were blended in proportions of 30% by weight and 70% by weight, respectively.

In addition, for a first surface layer (B), a raw material resin obtained as follows was used. That is, a propylene polymer having an Mn of 55,000, an Mw of 300,000, and an MFR of 5.6 g/10 min (NOVATEC (registered trademark) PP "FL4" manufactured by Japan Polypropylene Corporation; hereinafter, abbreviated as "PP-5"), a propylene polymer having an Mn of 59,000, an Mw of 310,000, and an MFR of 5.3 g/10 min (Prime Polypro "F-300SP" manufactured by Prime Polymer Co., Ltd.; hereinafter, abbreviated as "PP-6"), and a masterbatch A indicated in Table 2 were blended in proportions of 24.8% by weight, 72.2% by weight, and 3.0% by weight, respectively.

The raw material resin for the base material layer (A) was melted at 250° C. by using a 45-mm extruder, the raw material resin for the first surface layer (B) was melted at 250° C. by using a 25-mm extruder, and the raw material resin for the second surface layer (B) was melted at 250° C. by using a 20-mm extruder. These raw material resins were co-extruded in sheet forms from a T-die and were cooled and solidified such that the first surface layer (B) came into contact with a cooling roll at 40° C. Then, the resultant film was stretched 4.5 times in the machine direction (MD) at 125° C. Thereafter, in a tenter, both ends in the transverse direction (TD) of the film were held by a clip, and the film was preheated at 174° C. Then, the film was stretched 8.2 times in the transverse direction (TD) at 158° C. and heat-set at 175° C. while being relaxed by 6.7% in the transverse direction (TD). The film formation condition used at this time was defined as a film formation condition a.

In this manner, a biaxially oriented polypropylene film having a configuration of the first surface layer (B)/the base material layer (A)/the second surface layer (B) was obtained.

The surface of the first surface layer (B) of the biaxially oriented polypropylene film was subjected to corona treatment under the condition of a flowing-current value of 0.75 A by using a corona treatment machine manufactured by Softal Corona & Plasma GmbH, and then the biaxially oriented polypropylene film was wound with a winder. The obtained film had a thickness of 20 μm (the first surface layer (B)/the base material layer (A)/the second surface layer (B) bad thicknesses of 1.0 μm, 18.0 μm, and 1.0 μm, respectively).

Example 2

For the first surface layer (B) and the second surface layer (B), each raw material resin was obtained by blending 4.0% by weight of the masterbatch A indicated in Table 2, 23.8% by weight of PP-5, and 72.2% by weight of PP-6. Except for these conditions, the same conditions as those in Example 1 were used. Thus, a 20-μm biaxially oriented polypropylene film was obtained.

Example 3

For the first surface layer (B) and the second surface layer (B), each raw material resin was obtained by blending 6.0% by weight of the masterbatch B indicated in Table 2, 55.3% by weight of PP-5, and 39.7% by weight of PP-6. Except for these conditions, the same conditions as those in Example 1 were used. Thus, a 20-μm biaxially oriented polypropylene film was obtained.

Comparative Example 1

For a base material layer (A), a propylene homopolymer having an Mn of 56,000, an Mw of 310,000, an MFR of 2.5 g/10 min, and a mesopentad fraction [mmmm] of 94.8% (PP “FL203D” manufactured by Japan Polypropylene Corporation and having a copolymerization monomer content of 0 mol %; hereinafter, abbreviated as “PP-1”) indicated in Table 1 was used in a proportion of 100% by weight.

In addition, for a first surface layer (B), a raw material resin obtained as follows was used That is, a propylene-ethylene copolymer having an Mn of 80,000, an Mw of 220,000, and an MFR of 7.0 g/10 min (WINTEC (registered trademark) PP “WFX4M” manufactured by Japan Polypropylene Corporation; hereinafter, abbreviated as “PP-4”) indicated in Table 1, the PP-1 indicated in Table 1, and the masterbatch B indicated in Table 2 were blended in proportions of 52% by weight, 43.2% by weight, and 4.8% by weight, respectively.

For a second surface layer (B), a raw material resin obtained as follows was used. That is, PP-1 and the masterbatch B were blended in proportions of 93.6% by weight and 6.4% by weight, respectively.

The raw material resin for the base material layer (A) was melted at 250° C. by using the 45-mm extruder, the raw material resin for the first surface layer (B) was melted at 250° C. by using the 25-mm extruder, and the raw material resin for the second surface layer (B) was melted at 250° C. by using the 20-mm extruder. These raw material resins were co-extruded in sheet forms from the T-die and were cooled and solidified such that the first surface layer (B) came into contact with the cooling roll at 30° C. Then, the resultant film was stretched 4.5 times in the machine direction (MD) at 125° C. Thereafter, in the tenter, both ends in the transverse direction (TD) of the film were held by the clip, and the film was preheated at 168° C. Then, the film was stretched 8.2 times in the transverse direction (TD) at 155, and heat-set at 165° C. while being relaxed by 6.7% in the transverse direction (TD). The film formation condition used at this time was defined as a film formation condition b.

In this manner, a biaxially oriented polypropylene film having the configuration of the first surface layer (B)/the base material layer (A)/the second surface layer (B) was obtained.

The surface of the first surface layer (B) of the biaxially oriented polypropylene film was subjected to corona treatment under the condition of a flowing-current value of 0.75 A by using the corona treatment machine manufactured by Softal Corona & Plasma GmbH, and then the biaxially oriented polypropylene film was wound with a winder. The obtained film had a thickness of 20 μm (the first surface layer (B)/the base material layer (A)/the second surface layer (B) had thicknesses of 1.3 μm, 17.7 μm, and 1.0 μm, respectively).

Comparative Example 2

The same conditions as those in Comparative Example 1 were used except for the condition that the amounts of the resins to be ejected from the extruders were adjusted such that the thickness of the base material layer (A) was 15.1 μm and the thickness of the first surface layer (B) was 3.9 μm. Thus, a 20-μm biaxially oriented polypropylene film was obtained.

Comparative Example 3

For a first surface layer (B), a raw material resin obtained as follows was used. That is, the polypropylene homopolymer PP-1 indicated in Table 1, the polypropylene-ethylene copolymer PP-3 indicated in Table 1, and the masterbatch B indicated in Table 2 were blended in proportions of 45.0% by weight, 52.0% by weight, and 3.0% by weight, respectively. Except for this condition, the same conditions as those in Comparative Example 1 were used. Thus, a 20-μm biaxially oriented polypropylene film was obtained.

Comparative Example 4

For a first surface layer (B), a raw material resin obtained as follows was used. That is, the polypropylene homopolymer PP-1 indicated in Table 1, the polypropylene-ethylene copolymer PP-3 indicated in Table 1, and the masterbatch B indicated in Table 2 were blended in proportions of 1.2% by weight, 94.0% by weight, and 4.8% by weight, respectively Except for this condition, the same conditions as those in Comparative Example 1 were used Thus, a 20-μm biaxially oriented polypropylene film was obtained.

Comparative Example 5

The same conditions as those in Comparative Example 1 were used except that the film formation condition was changed to the following condition. Thus, a 20-μm biaxially oriented polypropylene film was obtained.

That is, the raw material resin for the base material layer (A) was melted at 250° C. by using the 45-mm extruder, the raw material resin for the first surface layer (B) was melted at 250° C. by using the 25-mm extruder, and the raw material resin for a second surface layer (B) was melted at 250° C. by using the 20-mm extruder. These raw material resins were co-extruded in sheet forms from the T-die and were cooled and solidified such that the first surface layer (B) came into contact with the cooling roll at 30° C. Then, the resultant film was stretched 4.5 times in the machine direction (MD) at 125° C. Thereafter, in the tenter, both ends in the transverse direction (TD) of the film were held by the clip, and the film was preheated at 175° C. Then, the film was stretched 8.2 times in the transverse direction (TD) at 166 and heat-set at 171° C. while being relaxed by 6.7% in the transverse direction (TD).

The film formation condition used at this time was defined as a film formation condition c.

Comparative Example 6

For a first surface layer (B), the PP-1 and the masterbatch B were blended in proportions of 95.2% by weight and 4.8% by weight, respectively. Except for this condition, the same conditions as those in Comparative Example 1 were used. Thus, a 20-μm biaxially oriented polypropylene film was obtained.

Regarding the films used in the above Examples and Comparative Examples, the raw materials, the manufacturing methods, and the physical properties are indicated in Table 4 and Table 5.

TABLE 4

| | | | | Example 1 | Example 2 | Example 3 | Comparative Example 1 | Comparative Example 2 |
|---|---|---|---|---|---|---|---|---|
| Base material layer (A) | Raw material | PP-1 | % by weight | 0.00 | 0.00 | 0.00 | 100.00 | 100.00 |
| | | PP-2 | % by weight | 30.00 | 30.00 | 30.00 | 0.00 | 0.00 |
| | | PP-3 | % by weight | 70.00 | 70.00 | 70.00 | 0.00 | 0.00 |
| | | PP-4 | % by weight | 0.00 | 0.00 | 0.00 | 0.00 | 0.00 |
| | | PP-5 | % by weight | 0.00 | 0.00 | 0.00 | 0.00 | 0.00 |
| | | PP-6 | % by weight | 0.00 | 0.00 | 0.00 | 0.00 | 0.00 |
| | | Antistatic agent | % by weight | 0.00 | 0.00 | 0.00 | 0.00 | 0.00 |
| | | Anti-blocking agent content | ppm by weight | 0 | 0 | 0 | 0 | 0 |
| | | Mesopentad fraction | % | 99.0 | 99.0 | 99.0 | 94.8 | 94.8 |
| | | MFR | g/10 min | 5.9 | 5.9 | 5.9 | 2.5 | 2.5 |
| | Thickness | | μm | 18 | 18 | 18 | 17.7 | 15.1 |
| First Surface layer (B) | Raw material | PP-1 | % by weight | 0.0 | 0.0 | 0.0 | 43.2 | 43.2 |
| | | PP-2 | % by weight | 0.0 | 0.0 | 0.0 | 0.0 | 0.0 |
| | | PP-3 | % by weight | 0.0 | 0.0 | 0.0 | 0.0 | 0.0 |
| | | PP-4 | % by weight | 0.0 | 0.0 | 0.0 | 52.0 | 52.0 |
| | | PP-5 | % by weight | 24.8 | 23.8 | 55.3 | 0.0 | 0.0 |
| | | PP-6 | % by weight | 72.2 | 72.2 | 39.7 | 0.0 | 0.0 |
| | | Masterbatch containing anti-blocking agent | % by weight | 3.0 | 4.0 | 6.0 | 4.8 | 4.8 |
| | | Type of masterbatch | — | A | A | B | B | B |
| | | Anti-blocking agent content | ppm by weight | 1500 | 2000 | 3000 | 2400 | 2400 |
| | | Mesopentad fraction | % | 95.0 | 95.9 | 97.8 | not measurable | not measurable |
| | | MFR | g/10 min | 3.8 | 3.8 | 3.9 | 4.9 | 4.9 |
| | Thickness | | μm | 1.0 | 1.0 | 1.0 | 1.3 | 3.9 |
| | Surface treatment | | | corona treatment | corona treatment | corona treatment | corona treatment | corona treatment |
| Second Surface layer (B) | Raw material | PP-1 | % by weight | 0.0 | 0.0 | 0.0 | 93.6 | 93.6 |
| | | PP-2 | % by weight | 0.0 | 0.0 | 0.0 | 0.0 | 0.0 |
| | | PP-3 | % by weight | 0.0 | 0.0 | 0.0 | 0.0 | 0.0 |
| | | PP-4 | % by weight | 0.0 | 0.0 | 0.0 | 0.0 | 0.0 |
| | | PP-5 | % by weight | 24.8 | 23.8 | 55.3 | 0.0 | 0.0 |
| | | PP-6 | % by weight | 72.2 | 72.2 | 39.7 | 0.0 | 0.0 |
| | | Masterbatch containing anti-blocking agent | % by weight | 3.0 | 4.0 | 6.0 | 6.4 | 6.4 |
| | | Type of masterbatch | — | A | A | B | B | B |
| | | Anti-blocking agent content | ppm by weight | 1500 | 2000 | 3000 | 3200 | 3200 |
| | | Mesopentad fraction | % | 95.0 | 95.9 | 97.8 | 94.8 | 94.8 |
| | | MFR | g/10 min | 3.8 | 3.8 | 3.9 | 2.5 | 2.5 |
| | Thickness | | μm | 1.0 | 1.0 | 1.0 | 1.0 | 1.0 |
| | Surface treatment | | | no treatment | no treatment | no treatment | no treatment | no treatment |
| Blending amount in film | | PP-1 | % by weight | 0.00 | 0.00 | 0.00 | 95.99 | 88.60 |
| | | PP-2 | % by weight | 27.00 | 27.00 | 27.00 | 0.00 | 0.00 |
| | | PP-3 | % by weight | 63.00 | 63.00 | 63.00 | 0.00 | 0.00 |
| | | PP-4 | % by weight | 0.00 | 0.00 | 0.00 | 3.38 | 10.14 |
| | | PP-5 | % by weight | 2.48 | 2.38 | 5.53 | 0.00 | 0.00 |
| | | PP-6 | % by weight | 7.22 | 7.22 | 3.97 | 0.00 | 0.00 |
| | | Antistatic agent | % by weight | 0.00 | 0.00 | 0.00 | 0.00 | 0.00 |
| | | Masterbatch containing anti-blocking agent | % by weight | 0.30 | 0.40 | 0.60 | 0.63 | 1.26 |
| | | Anti-blocking agent content | ppm | 150 | 200 | 300 | 316 | 628 |
| Film formation condition (see Table 3) | | | | a | a | a | b | b |

| | | | | Comparative Example 3 | Comparative Example 4 | Comparative Example 5 | Comparative Example 6 |
|---|---|---|---|---|---|---|---|
| Base material layer (A) | Raw material | PP-1 | % by weight | 100.00 | 100.00 | 100.00 | 100.00 |
| | | PP-2 | % by weight | 0.00 | 0.00 | 0.00 | 0.00 |
| | | PP-3 | % by weight | 0.00 | 0.00 | 0.00 | 0.00 |
| | | PP-4 | % by weight | 0.00 | 0.00 | 0.00 | 0.00 |
| | | PP-5 | % by weight | 0.00 | 0.00 | 0.00 | 0.00 |
| | | PP-6 | % by weight | 0.00 | 0.00 | 0.00 | 0.00 |
| | | Antistatic agent | % by weight | 0.00 | 0.00 | 0.00 | 0.00 |
| | | Anti-blocking agent content | ppm by weight | 0 | 0 | 0 | 0 |
| | | Mesopentad fraction | % | 94.8 | 94.8 | 94.8 | 94.8 |
| | | MFR | g/10 min | 2.5 | 2.5 | 2.5 | 2.5 |
| | Thickness | | μm | 17.7 | 17.7 | 17.7 | 17.7 |
| First Surface | Raw material | PP-1 | % by weight | 45.0 | 1.2 | 43.2 | 95.2 |
| | | PP-2 | % by weight | 0.0 | 0.0 | 0.0 | 0.0 |

TABLE 4-continued

| | | | | | | | |
|---|---|---|---|---|---|---|---|
| layer | | PP-3 | % by weight | 0.0 | 0.0 | 0.0 | 0.0 |
| (B) | | PP-4 | % by weight | 52.0 | 94.0 | 52.0 | 0.0 |
| | | PP-5 | % by weight | 0.0 | 0.0 | 0.0 | 0.0 |
| | | PP-6 | % by weight | 0.0 | 0.0 | 0.0 | 0.0 |
| | | Masterbatch containing anti-blocking agent | % by weight | 3.0 | 4.8 | 4.8 | 4.8 |
| | | Type of masterbatch | — | B | B | B | B |
| | | Anti-blocking agent content | ppm by weight | 1500 | 2400 | 2400 | 2400 |
| | | Mesopentad fraction | % | not measurable | not measurable | not measurable | not measurable |
| | | MFR | g/10 min | 4.9 | 6.8 | 4.9 | 2.5 |
| | Thickness | | μm | 1.3 | 1.3 | 1.3 | 1.3 |
| | Surface treatment | | | corona treatment | corona treatment | corona treatment | corona treatment |
| Second | Raw | PP-1 | % by weight | 93.6 | 93.6 | 93.6 | 93.6 |
| Surface | material | PP-2 | % by weight | 0.0 | 0.0 | 0.0 | 0.0 |
| layer | | PP-3 | % by weight | 0.0 | 0.0 | 0.0 | 0.0 |
| (B) | | PP-4 | % by weight | 0.0 | 0.0 | 0.0 | 0.0 |
| | | PP-5 | % by weight | 0.0 | 0.0 | 0.0 | 0.0 |
| | | PP-6 | % by weight | 0.0 | 0.0 | 0.0 | 0.0 |
| | | Masterbatch containing anti-blocking agent | % by weight | 6.4 | 6.4 | 6.4 | 5.4 |
| | | Type of masterbatch | — | B | B | B | B |
| | | Anti-blocking agent content | ppm by weight | 3200 | 3200 | 3200 | 32.00.0 |
| | | Mesopentad fraction | % | 94.8 | 94.8 | 94.8 | 94.8 |
| | | MFR | g/10 min | 2.5 | 2.5 | 2.5 | 2.5 |
| | Thickness | | μm | 1.0 | 1.0 | 1.0 | 1.0 |
| | Surface treatment | | | no treatment | no treatment | no treatment | no treatment |
| Blending | | PP-1 | % by weight | 96.11 | 93.26 | 95.99 | 99.37 |
| amount in | | PP-2 | % by weight | 0.00 | 0.00 | 0.00 | 0.00 |
| film | | PP-3 | % by weight | 0.00 | 0.00 | 0.00 | 0.00 |
| | | PP-4 | % by weight | 3.38 | 6.11 | 3.38 | 0.00 |
| | | PP-5 | % by weight | 0.00 | 0.00 | 0.00 | 0.00 |
| | | PP-6 | % by weight | 0.00 | 0.00 | 0.00 | 0.00 |
| | | Antistatic agent | % by weight | 0.00 | 0.00 | 0.00 | 0.00 |
| | | Masterbatch containing anti-blocking agent | % by weight | 0.52 | 0.63 | 0.63 | 0.63 |
| | | Anti-blocking agent content | ppm | 258 | 316 | 316 | 316 |
| Film formation condition (see Table 3) | | | | b | b | c | b |

TABLE 5

| | | | Example 1 | Example 2 | Example 3 | Comparative Example 1 | Comparative Example 2 |
|---|---|---|---|---|---|---|---|
| Film physical properties | Thickness | μm | 20 | 20 | 20 | 20 | 20 |
| | Haze | % | 1.5 | 1.8 | 2.0 | 2.7 | 2.8 |
| | Tensile elastic modulus (machine direction) | GPa | 2.2 | 2.3 | 2.4 | 2.3 | 2.2 |
| | Tensile elastic modulus (transverse direction) | GPa | 4.1 | 4.1 | 4.2 | 4.6 | 4.5 |
| | Heat shrinkage rate at 150° C. (machine direction) | % | 4.5 | 6.0 | 5.7 | 8.7 | 10.8 |
| | Heat shrinkage rate at 150° C. (transverse direction) | % | 5.7 | 5.8 | 5.8 | 16.8 | 18.5 |
| | Number of protrusions of 500 nm or larger (first surface layer B) | piece | 138 | 162 | 134 | 78 | 72 |
| | Wetting tension (first surface layer B) | mN/m | 41 | 41 | 41 | 43 | 43 |
| | Martens hardness (first surface layer B) | $N/mm^2$ | 271 | 281 | 269 | 240 | 235 |
| | Surface resistance value (first surface layer B) | LogΩ | 16.3 | 16.1 | 16.3 | 15.2 | 15.4 |
| | Arithmetic average roughness Ra (first surface layer B) | nm | 2.5 | 2.5 | 2.4 | 4.3 | 4.8 |
| Film processing evaluation | Evaluation regarding wrinkles on roll | Excellent, Good, Not good, Bad | Excellent | Excellent | Excellent | Good | Bad |
| | Evaluation of coating suitability (first surface layer B) | Excellent, Good, Not good, Bad | Excellent | Good | Excellent | Good | Good |
| | Evaluation regarding adhesion of aluminum vapor deposition film (first surface layer B) | Good, Not good, Bad | Good | Good | Good | Not good | Not good |

TABLE 5-continued

| | | | Comparative Example 3 | Comparative Example 4 | Comparative Example 5 | Comparative Example 6 |
|---|---|---|---|---|---|---|
| Film physical properties | Thickness | μm | 20 | 20 | 20 | 20 |
| | Haze | % | 2.6 | 2.9 | 6.2 | 2.3 |
| | Tensile elastic modulus (machine direction) | GPa | 2.2 | 2.5 | 2.4 | 2.3 |
| | Tensile elastic modulus (transverse direction) | GPa | 4.7 | 4.8 | 4.9 | 4.6 |
| | Heat shrinkage rate at 150° C. (machine direction) | % | 10.0 | 10.1 | 8.0 | 9.1 |
| | Heat shrinkage rate at 150° C. (transverse direction) | % | 21.7 | 19.8 | 13.7 | 18.2 |
| | Number of protrusions of 500 nm or larger (first surface layer B) | piece | 45 | 62 | 102 | 38 |
| | Wetting tension (first surface layer B) | mN/m | 42 | 43 | 41 | 39 |
| | Martens hardness (first surface layer B) | $N/mm^2$ | 220 | 220 | 250 | 290 |
| | Surface resistance value (first surface layer B) | LogΩ | 15.5 | 15.5 | 15.3 | 15.4 |
| | Arithmetic average roughness Ra (first surface layer B) | nm | 4.1 | 5.0 | 5.2 | 2.2 |
| Film processing evaluation | Evaluation regarding wrinkles on roll | Excellent, Good, Not good, Bad | Not good | Bad | Good | Bad |
| | Evaluation of coating suitability (first surface layer B) | Excellent, Good, Not good, Bad | Good | Good | Good | Bad |
| | Evaluation regarding adhesion of aluminum vapor deposition film (first surface layer B) | Good, Not good, Bad | Not good | Not good | Not good | Bad |

The biaxially oriented polypropylene films in the forms of film rolls obtained in Examples 1 to 3 had no wrinkles and were excellent. In addition, each of these biaxially oriented polypropylene films did not experience peeling of the aluminum vapor deposition layer and did not have repelled portions of the coat solution, and thus, had excellent adhesiveness.

Meanwhile, each of the films in Comparative Examples 1 to 6 was inferior in the film roll winding quality and/or the adhesiveness.

INDUSTRIAL APPLICABILITY

The biaxially oriented polypropylene film in the present invention has, without impairing excellent transparency and mechanical properties intrinsically possessed by the biaxially oriented polypropylene film, excellent film winding quality and excellent adhesiveness to a vapor deposition layer, a coat layer, or an adhesive layer used for lamination with another member film.

Therefore, the biaxially oriented polypropylene film is suitable as a raw film for processing. The biaxially oriented polypropylene film can be used as a food packaging film for confectioneries or the like, a label, an industrial film, or the like. In addition, the film can be produced at low cost, and thus, is industrially useful.

The invention claimed is:

1. A biaxially oriented polypropylene film comprising:

a base material layer (A) containing a polypropylene-based resin as a main component; and a surface layer (B) containing a polypropylene-based resin as a main component and satisfying the following conditions (1) to (5):

(1) the number of protrusions of 500 nm or larger in a surface area of 2000 $\mu m^2$ on the surface layer (B) is 50 or larger and 200 or smaller, (2) a surface of the surface layer (B) has a wetting tension of 38 mN/m or higher, (3) the surface has a Martens hardness of 350 $N/mm^2$ or lower, (4) the surface has an arithmetic average roughness of 1.5 nm or larger and 3.0 nm or smaller, and (5) the surface of the surface layer (B) has a surface resistance value of 14 Log Ω or larger.

2. The biaxially oriented polypropylene film according to claim 1, wherein the film has a haze value of 6% or lower.

3. A laminated body comprising:

the biaxially oriented polypropylene film according to claim 2; and an unstretched polypropylene film.

4. The biaxially oriented polypropylene film according to claim 2, wherein the film has a tensile elastic modulus, in a machine direction, of 2.0 GPa or higher and has a tensile elastic modulus, in a transverse direction, of 3.0 GPa or higher.

5. The biaxially oriented polypropylene film according to claim 1, wherein the film has a tensile elastic modulus, in a machine direction, of 2.0 GPa or higher and has a tensile elastic modulus, in a transverse direction, of 3.0 GPa or higher.

6. A laminated body comprising:

the biaxially oriented polypropylene film according to claim 3; and an unstretched polypropylene film.

7. The biaxially oriented polypropylene film according to claim 1, wherein the film has a thickness of 5 μm or larger and 200 μm or smaller.

8. A laminated body comprising:

the biaxially oriented polypropylene film according to claim 4; and an unstretched polypropylene film.

9. A laminated body comprising:

the biaxially oriented polypropylene film according to claim 1; and an unstretched polypropylene film.

10. The biaxially oriented polypropylene film according to claim 4, wherein the film has a thickness of 5 μm or larger and 200 μm or smaller.

11. A laminated body comprising:

the biaxially oriented polypropylene film according to claim 9; and an unstretched polypropylene film.

12. A laminated body comprising:

the biaxially oriented polypropylene film according to claim 10; and an unstretched polypropylene film.

* * * * *